O. W. GOSLEE.
Tobacco Ridger.
No. 106,810.
Patented Aug. 30, 1870.
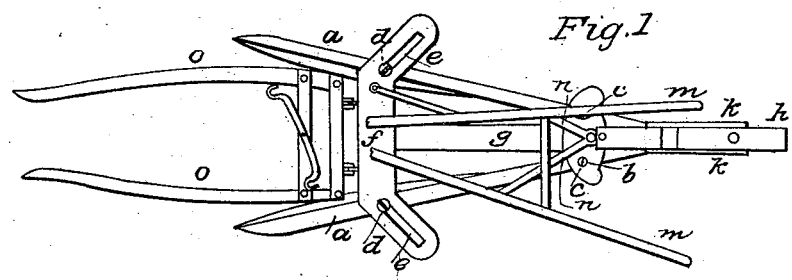
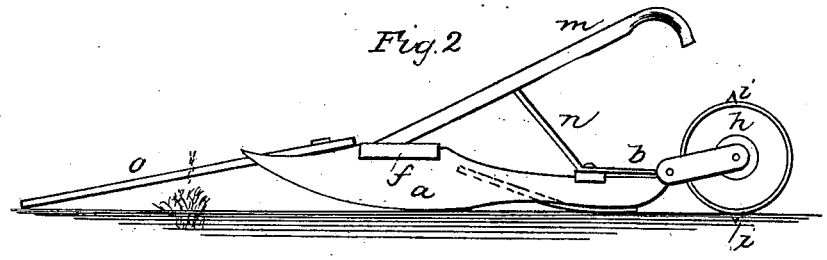

UNITED STATES PATENT OFFICE.

OZIAS W. GOSLEE, OF GLASTENBURY, CONNECTICUT.

IMPROVEMENT IN TOBACCO-RIDGER.

Specification forming part of Letters Patent No. 106,810, dated August 30, 1870.

*To all whom it may concern:*

Be it known that I, OZIAS W. GOSLEE, of Glastenbury, county of Hartford and State of Connecticut, have invented certain new and useful Improvements in Tobacco-Ridger, &c.; and to enable others skilled in the art to make and use the same, I will proceed to describe, referring to the drawings, in which the same letters indicate like parts in each of the figures.

The nature of this invention consists in combining and arranging mechanisms (all or nearly all of which, when separately considered, are in common use) for gathering the earth with its surface-manure or fertilizer into a ridge, flatten the top or upper portion thereof, and form depressions thereon for seeds or plants by one and the same operation, the object of which is to prepare the ground in the most rapid manner to receive the seed or plant, to concentrate the fertilizer in the ridge closely to the seed or plant, flatten and mark the ground, and thereby rapidly prosecute the work of seeding or setting the plants in the ground.

In the accompanying drawings, Figure 1 is a top view of this invention. Fig. 2 is a side view.

*a a* are shear-plates, hinged to the hub-plate *b* by pins, bolts, or screws *c c*. Their front ends and their horizontal and perpendicular diverging position are fixed or are held, when regulated as desirable, by bolts or screws *d d* passing through the adjusting-slits *e* or beam *f* into ears or the edge of the shear-plates *a a*.

*g* is a ridge-flattener plate, the front end of which is secured firmly to the beam *f*, while the rear end is curved down and bears upon the ground under the hub-plate *b*. It may be made of any desirable shape, only its bearing-surface must be of sufficient width to flatten the top of the ridge.

*h* is a marking-wheel, having one or more projections, *i*, upon its surface, the object of which is twofold—to divide and mark the ground the desired distance from one point to another for the reception of the seed or plant. This wheel is hung and rotates in an oscillating frame-work, *k*, which is held firmly to the rear of the hub-plate *b*, so that the wheel will adapt itself to the ground by its own gravity.

*m m* are handles, by which the action of the machine is guided. Their lower ends are secured to the beam *f*, and they are supported from the hub-plate *b* by rods *n*. *o* are the operating-shafts.

The ground having been prepared, and the fertilizer having been spread broadcast over its surface, is ready for this machine. The operator, with a horse hitched to the machine, travels over the ground in quite a rapid manner, the shear-plates gathering the surface of the ground into an elevated ridge, which includes the fertilizer and a good portion of the manure. The flattener, following, flattens the top of the ridge, and the marking-wheel divides or fixes the distance of each hill, and also forms a depression for the reception of the seed or plant.

It has become a well-settled fact that the ridge-ground will produce the most profitable crop, and by this invention it can be the most rapidly and advantageously performed.

I believe I have thus shown the nature, construction, and advantage of this invention, so as to enable others skilled in the art to make and use the same therefrom.

What I claim, therefore, and desire to secure by Letters Patent, is—

The combination of the shear-plates *a a*, flattener *g*, and dividing and marking wheel *h*, substantially as and for the purpose set forth.

OZIAS W. GOSLEE. [L. S.]

Witnesses:
 E. W. BLISS,
 JEREMY W. BLISS.